Patented Feb. 2, 1943

2,309,768

UNITED STATES PATENT OFFICE 2,309,768

PROCESS FOR PRODUCING POLYETHINES OR THEIR DERIVATIVES

Willy O. Herrmann, Deisenhofen, Upper Bavaria, and Wolfram Haehnel and Hans Deutsch, Munich, Germany; vested in the Alien Property Custodian No Drawing. Application June 21, 1939, Serial No. 280,382. In Germany July 13, 1938

6 Claims. (Cl. 260—73)

This invention relates to a process for producing polyethines or their derivatives.

It is known that the polyvinyl compounds of monomers, whose vinyl group is attached to a carbon atom, as for example polyacrylic acid compounds and polystyrol, can be depolymerized to the monomeric compound by heating them to a correspondingly high temperature. In contrast thereto, according to the former knowledge of their thermal behavior, the polymers of vinyl compounds, whose vinyl group is not attached to a carbon atom, for instance the polyvinyl alcohols and their derivatives, suffer no depolymerization upon heating but undergo an extensive decomposition. Hereby a more or less charred residue is formed along with a mixture of gaseous, liquid and oily decomposition products; when esters were used the presence of the corresponding acids was analytically found.

Where the cause for such diversified behavior lies is still an open question. Is it, for example, that the polyacryl compounds or polystyrols are not at all true polymers but merely products of a reversible aggregation of the monomers; or is it on the other hand, that the polyvinyl alcohols and their derivatives are true polymers, obviously aggregates of monomeric constituents of irreversibly polymerized ethines. In any case the fact has been definitely established that the depolymerizing by heating of polyvinyl alcohol or its derivatives to the corresponding monomer has not been successful.

It was then found that one could so conduct the heat treatment of polyvinyl alcohol and its derivatives that only a breaking-up and not an extensive decomposition occurred. This breaking-up resulted, independently of starting material, in good quantitative yields of polyethine as characteristic product on the one hand, and the rest in monomeric form on the other. For example, polyvinyl acetate breaking up into the polymerized carbon skeleton, polyethine, and free acetic acid.

Polyethine, a polymerized hydrocarbon with the composition $(C_2H_2)x$, is a heat-resistant solid mass, more or less porous, partly cuprene-like, or hard and compact. It is insoluble in the usual organic solvents, such as alcohol, aliphatic and aromatic hydrocarbons, chlorhydrocarbons, pyridine, etc.

For the splitting-off of constituents from these polymers it is essential, according to this invention, that the splitting-off occurs below the decomposition temperature, as at this temperature the polymerized carbon chain suffers extensive disintegration. The temperature, at which a certain polymer splits-off constituents, depends upon the equilibrium relation, respectively the vapor pressure relation, in a similar manner as that of the vaporization temperature of a volatile substance absorbed on a surface-active body. Under suitable conditions a certain skeleton-cleaving tendency is present even at low temperatures. How much of a practical effect this has depends, apart from the duration of the treatment, firstly, on how small the vapor pressure of the volatile constituent to be split-off will be in the liquid or gaseous medium of the polymer in question; secondly, if this medium contains substances in sufficient concentration that possess a greater attraction for the polymerized carbon chain than the substance to be split off. This is similar to the case of the displacement of one absorbed substance by another. This splitting off of constituents may be accordingly promoted by the choice of a suitably indifferent medium in which the heating takes place, for example, paraffin oil, or by means of liquids, melts, vapors or gases that are capable of physically or chemically combining with the component to be split off. This means that, according to the particular case, acids, alcohols, aldehydes or waterbinding substances may be used; further, that by the action of such substances, that are capable of forming derivates with the nuclear polymer, such as acids, alcohols, aldehydes, ketones and water, this splitting-off may therefore be promoted. The well known procedures, such as evacuation, the passing through of liquid, gas or vapor currents, etc. are also effective. Finally, this splitting-off may be accelerated by catalysts, and thus allow the use of lower temperatures. The presence of oxygen or the addition of sulphur, for example, greatly promotes the splitting-off of alcohol from polyvinyl ether.

The selected temperature is of meaning not alone for the velocity of the reaction but also for the course of the reaction. For example, it was found possible, under suitable conditions, to split off in the characteristic manner, only half of the water bound on the polyethine nucleus under 200° C., and the other half at about 250° C. with the subsequent formation of polyethine. Analogous is the splitting-off of alcohol from polyvinyl ether; the first half is split off at 300° C. and the true polyethine formation occurs only in the range 350°–400° C. The diversity in the temperatures, at which the splitting-off of constituents from the various polymers occurs, makes possible such reactions as are described further on, for example, the reaction of polyvinyl acetate with glycerine under formation of polyvinyl glycerinether, because the temperature at which polyvinyl acetate splits off constituents is lower than the corresponding temperature of the formed polyvinyl glycerinether.

These examples show that the most favorable temperature for the splitting-off of constituents may be chosen in each case according to the kind of polyvinyl compound used and to the degree of splitting. This also holds for other reaction conditions. For example, in choosing the reaction conditions for the splitting-off of constituents from polyvinyl acetals, one must consider the particularly high reactivity of the aldehyde which is split off in order to avoid any undesired side reactions.

On the basis of the above described differing splitting-off tendencies of the various groups attached to the polyethine nucleus, it is seen possible not only to obtain the free polyethine itself, but also intermediate products.

The modification possibilities are thereby increased in that one has a wider choice of initial materials, for instance mixed polymers. Such substances are: the polymeric esters, ethers and acetals that contain several acids, alcohols or carbonyl compounds; mixed polyvinyl compounds, for example ester acetal; if necessary also partial derivatives of polyvinyl alcohol and those derivatives that contain free hydroxyl groups; and furthermore, mixed polymers and polymers of mixtures. The differences in the splitting-off temperatures of the individual components thereby allow a greater range of modification.

Moreover, by a premature interruption of the reaction, products may be obtained which still contain a definite fraction of the components that were attached to the polyethine in the original polymer. Consequently results a graduated series of compounds whose empirical composition is $C_2H_2.K_x$, where K may be, for example, an organic or inorganic acid, alcohol, phenol, aldehyde, ketone or water, with $x$ varying from 0 to 1.

However, according to this invention, the process offers still another method for obtaining intermediate products. If one conducts the splitting-off in presence of such substances that are capable of forming derivatives with the polyethine, which is present in the nascent state on being formed from polyvinyl alcohol or its derivatives, one can combine these substances with this nascent, nuclear polymer. In this way it is not only possible to prepare intermediate products of a definite type between polyethine and the polyvinyl compounds, but also true polyvinyl compounds, which belong to another class of derivatives than that of the original substance, by especial promotion of the reaction of these added substances in the above sense. For example, polyvinyl acetate may be transformed into the glycerine ether of the polyvinyl alcohol. Further, such a reaction gives mixed polymers, part of which belong to the true polyvinyl derivative class, and part to be more or less considered as polyethine derivatives.

The following examples illustrate in easily understandable cases the fundamental principles of the reactions according to this invention.

Example I 86 gr. of highly-polymerized polyvinyl acetate were slowly heated in a flask with attached condenser. At 200° C. a faint odor of acetic acid was detected without distillation having begun. At 250° C. a rapid distillation began and the entire liquid was distilled off between 250°–260° C. Theoretically the 86 gr. of polyvinyl acetate should yield 60.0 gr. of acetic acid and 26.0 gr. of polyethine. 58.7 gr. of acetic acid and 26.2 gr. of polyethine were obtained. The latter was compact, pitch-black and lustrous.

Example II

Polyvinyl acetate of low degree of polymerization was heated in paraffin oil. The splitting-off of acetic acid also occurred here chiefly above 200° C., and at 250° C. became marked. The heating at 250°–265° was continued for several hours. Hereby resulted at first a transformation of the polyvinylacetate into a rubber-like mass, and then a formation of a dark brown, flint-like, hard product. This was then pulverized and again heated in paraffin for two hours at 265° C. and subsequently purified by extraction of the paraffin with benzine in a Soxhlet extractor. Pure polyethine as a hard, brown-black substance was obtained.

Example III

Polyvinyl chloride of medium degree of polymerization was heated in an electric oven to 220° C. The evolution of hydrochloric acid was noticed even below 200° C. After 3–4 hours the splitting-off of hydrochloric acid was completed. The originally white, pulverized polyvinyl chloride turned brown at the beginning of heating and then changed into a hard, brittle, almost black product, that proved to be practically polyethine.

In another experiment the same amount of polyvinyl chloride was heated for about 3 hours at 245° C. in a flask fitted with a tube with ten bulbs which was filled with caustic soda solution. More than 90% of the hydrochloric acid contained in the polyvinyl chloride was found in this tube. The residual polyethine was a solid, brown, frothy mass.

Example IV 20 gr. of polyvinyl chloride of medium degree of polymerization were heated in paraffin oil for 10 hours at 215–220° C. A weight loss of 11.7 gr. occurred (theoretical hydrochloric acid loss 11.6 gr.) and after pulverizing and purification 8.2 gr. of a black-brown, hard polyethine were obtained.

Example V

If one introduces technical polyvinyl chloride at a temperature of 320° C. into a water-free caustic soda melt, a lively reaction occurs, with the instant formation of polyethine and reaction of the liberated hydrochloric acid with the caustic soda.

The course of this reaction may be better observed if the polyvinyl chloride is introduced into a melt of sodium hydroxide monohydrate. One can heat this mixture to more than 200° C. without an appreciable reaction taking place. The polyvinyl chloride merely becomes somewhat darker and its impurities give off small amounts of chlorine to the melt. The true reaction occurs first above 240° C., where the water of hydration is completely expelled, with the formation of polyethine and liberation of hydrochloric acid.

Example VI

By heating a mixed-polymer, aldehyde-containing mixture of vinyl formate and vinyl acetate up to 200° C., the entire aldehyde, but no acid, was given off. The two fatty acids were first distilled off at 230° C., leaving the polyethine as a lemon-yellow, frothy mass.

The corresponding splitting-off of water from polyvinyl alcohol follows at somewhat different course, as an anhydride is formed as intermediate product. This anhydride may be prepared and isolated by various means. The heating of polyvinyl alcohol at 250° C. yielded only about 75% of the expected amount of water. A polyethine-similar substance was formed with a bright-yellow color and porous structure.

*Example VII*

A polyvinyl alcohol of medium degree of polymerization obtained from alkali saponification, was heated for 10 hours at 215–220° C. without an appreciable dehydration and left the polyvinyl alcohol apparently unchanged. The dehydration began at 250° and was very rapid at 280° C., accompanied by a darkening of the product. This heating was continued for several hours, the hard, dark-colored product pulverized and again heated in paraffin oil for several hours, then washed with benzine and the paraffin removed in a Soxhelt extractor. An almost theoretical yield of a hard, dark-brown polyethine was obtained.

Polyvinyl ethers, acetals and similar polyvinyl alcohol derivatives have higher splitting-off temperatures. A typical example of such a splitting-off process in the case of polyvinyl ethyl ether is described in detail in the next example.

*Example VIII*

100 parts by weight of polyvinyl ethyl ether were heated in a distillation flask, a weak current of air being passed through the melt. At approximately 300° C. the splitting-off of alcohol began and continued rather actively until 30 parts of ethyl alcohol distilled over, which amount represents almost half of the removable alcohol. At this point the formation of alcohol decreased to a negligible amount. By this splitting-off of alcohol, the melt steadily increased in viscosity and proved upon cooling to be a typical raw rubber-like product which possessed an exceptional elasticity and a cohesion, markedly greater than that possessed by raw-rubber. This dissolves in the same way as rubber, that is, under strong swelling with small amounts of solvent it gradually becomes a true solution by stirring with further additions of the solvent; it is highly viscous in rubber solvents, for example chloroform, benzol and carbon bisulphide; and is, in contrast to rubber, soluble in alcohol. Incidentally, this product, like rubber, can also be vulcanized in the cold with sulphur monochloride, for example in chloroform solution; and by heat treatment with sulphur.

One obtains the same rubber-like subtsance if one simply heats polyvinyl ethyl ether in an open vessel at approximately 300° C. with stirring. On the other hand in the absence of oxygen the reaction goes much more slowly at 300° C., and if the heating is continued at 350° C. under these conditions an extensive breaking up of the polymer chain occurs. Therefore, according to this invention, the presence of oxygen catalytically promotes the splitting-off of alcohol. Of other catalysts sulphur may be mentioned, an addition of 2% of which being sufficient to cause the conversion of polyvinyl ethyl ether into the rubber-like substance at 170° C.

If one gradually heats in air the raw rubber-like substance up to 400° C., the second half of the alcohol is split off and polyethine is formed.

When sheet iron was smeared with a coating of this rubberlike intermediate product, which was allowed to dry and then gradually heated up to 400° C. so that no blisters were formed, and held at this temperature for some time, there formed a hard, flexible, glossy, firmly attached, enamel-like coating. This coating has a high heat-resistivity, is practically unaffected by all organic solvents, including glacial acetic acid and chlorohydrocarbons, as well as strong mineral acids such as concentrated sulphuric acid. For practical purposes it would be advantageous to apply several coating in order to avoid any pore-channels, which originate from blisters, from reaching to the metal surface.

Polyethine protective coatings may also be prepared from polyvinyl esters, etc., or in general, from those compounds, and by whose reaction temperatures, a particularly resistive coating is formed.

*Example IX*

100 gr. of polyvinyl acetate of low degree of polymerization were heated on the oil bath with 400 gr. of glycerin. Above 200° C. the two visible phases of glycerin and polyvinyl acetate disappeared, and a slow formation of vapor set in, which first became rapid at 250–260° C. The glycerin triacetate (B. P. 258° C.), formed from the glycerin and acetic acid, was distilled off at 260–265° C. and the residue poured into water. Hereby a tough, soft, gold-yellow mass precipitated out, which was purified by kneading with water and then dried at 118–120° C. A hard, bright-yellow resin was obtained, which is soluble in alcohol but not in acetone. It is a polyvinyl glycerin ether of the formula

$(C_3H_5(OC_2H_3)_3)_x$

Theoretical: C=63.49; H=8.29. Found: C=62.59; H=8.44.

During this reaction the solution of the polyvinyl acetate of low degree of polymerization begins and rapidly continues with the rise of temperature. If one begins with a higher polymer it is necessary to heat it under reflux for hours at 260–270° C., with still higher polymers for days, in order to homogenize the mixture and thereby bring about the reaction.

*Example X*

Polyvinyl alcohol, which was obtained from the alkali saponification of polyvinyl acetate, was dissolved under heating in ten times the amount of glycerine. At 250° C. a reaction began which became rapid at 270–280°. After several hours heating at this temperature no more unchanged polyvinyl alcohol could be detected in a test with alcohol. The reaction products was soluble in alcohol. The polyvinyl glycerin ether was precipitated out by acetone and purified by reprecipitation.

The invention claimed is:

1. Process for the production of polymers of the formula $(C_2H_2)_x$ where $x$ is the number of units in the polymer which comprises heating a polymer of a compound having the vinyl $CH_2=CH-$ group attached thru oxygen to the remainder of the molecule, said polymer being selected from the class consisting of esters, acetals, and ethers of polyvinyl alcohol, said heating being at a temperature of at least about 250° C., such that the hydroxyl compound forming the vinyl polymer in combination with the hydrocarbon polymer is split off, removing the liberated hydroxyl compound and stopping the reaction before the hydrocarbon polymer is substantially attacked.

2. Process for the production of polymers of the formula $(C_2H_2)x$ where $x$ is the number of units in the polymer which comprises heating a polymer of a vinyl ester of an organic carboxylic acid at a temperature, of at least about 250° C., such that the organic acid is split off, removing the organic acid and stopping the reaction before the hydrocarbon polymer is substantially attacked.

3. Process for the production of polymers of the formula $(C_2H_2)x$ where $x$ is the number of units in the polymer which comprises heating polymeric vinyl acetate to temperatures approximately between 250° and 280° C. and distilling off the liberated acetic acid.

4. Process for the production of rubber-like substances which comprises heating a polymerized vinyl ether at a temperature, of at least 250° C., such that the non-vinyl alcohol is split off, removing said alcohol and stopping the reaction before the hydrocarbon polymer remaining from the removal of the alcohol from the polyvinyl ether is substantially attacked.

5. Process of claim 4 wherein a catalyst is employed, said catalyst being an element of the sixth group of the periodic system and having an atomic weight between 15 and 33.

6. Process for the production of rubber-like substances which comprises heating polyvinyl ethyl ether in the presence of oxygen at a temperature of about 300° C.

WILLY O. HERRMANN.
WOLFRAM HAEHNEL.
HANS DEUTSCH.